US008885702B2

(12) United States Patent
Yang et al.

(10) Patent No.: US 8,885,702 B2
(45) Date of Patent: Nov. 11, 2014

(54) RATE-DISTORTION-COMPLEXITY OPTIMIZATION OF VIDEO ENCODING GUIDED BY VIDEO DESCRIPTION LENGTH

(75) Inventors: Lei Yang, Palo Alto, CA (US); Debargha Mukherjee, Sunnyvale, CA (US)

(73) Assignee: Google Inc., Mountain View, CA (US)

(*) Notice: Subject to any disclaimer, the term of this patent is extended or adjusted under 35 U.S.C. 154(b) by 320 days.

(21) Appl. No.: 13/275,090

(22) Filed: Oct. 17, 2011

(65) Prior Publication Data

US 2013/0094565 A1   Apr. 18, 2013

(51) Int. Cl.
| | | |
|---|---|---|
| H04N 19/40 | (2014.01) | |
| H04N 19/192 | (2014.01) | |
| H04N 19/15 | (2014.01) | |
| H04N 19/152 | (2014.01) | |
| H04N 19/154 | (2014.01) | |
| H04N 19/115 | (2014.01) | |
| H04N 19/194 | (2014.01) | |
| H04N 19/147 | (2014.01) | |
| H04N 19/156 | (2014.01) | |

(52) U.S. Cl.
CPC ....... H04N 19/002 (2013.01); H04N 19/00472 (2013.01); H04N 19/00357 (2013.01); H04N 19/00187 (2013.01); H04N 19/00363 (2013.01); H04N 19/00193 (2013.01); H04N 19/0006 (2013.01); H04N 19/00175 (2013.01); H04N 19/00206 (2013.01)
USPC ........................................................ 375/240

(58) Field of Classification Search
USPC .......................................... 375/240; 382/239
See application file for complete search history.

(56) References Cited

U.S. PATENT DOCUMENTS

| | | | |
|---|---|---|---|
| 2003/0103563 A1* | 6/2003 | Amini et al. ............. | 375/240.03 |
| 2003/0156198 A1 | 8/2003 | Lee | |
| 2005/0232497 A1 | 10/2005 | Yogeshwar et al. | |
| 2006/0018378 A1 | 1/2006 | Piccinelli et al. | |
| 2006/0045368 A1* | 3/2006 | Mehrotra ...................... | 382/239 |
| 2006/0203904 A1 | 9/2006 | Lee | |
| 2008/0112483 A1* | 5/2008 | Lu et al. .................... | 375/240.03 |
| 2008/0192822 A1 | 8/2008 | Chang et al. | |
| 2008/0298469 A1 | 12/2008 | Liu et al. | |
| 2010/0118982 A1 | 5/2010 | Chatterjee et al. | |
| 2011/0002381 A1 | 1/2011 | Yang et al. | |

OTHER PUBLICATIONS

PCT International Search Report and Written Opinion for PCT/US2012/059192, Mar. 19, 2013, 6 pages.
PCT International Search Report and Written Opinion for PCT/US2012/059194, Mar. 19, 2013, 7 pages.

(Continued)

Primary Examiner — Dave Czekaj
Assistant Examiner — Berteau Joisil
(74) Attorney, Agent, or Firm — Fenwick & West LLP

(57) ABSTRACT

A system and method provide a video description length (VDL) guided constant quality video encoding strategy with bitrate constraint and a video coding system for optimizing encoding bitrate, distortion and complexity of an input video. The method obtains an overall VDL, temporal VDL and spatial VDL of the input video and compares the overall VDL, temporal VDL and spatial VDL of the input video with a reference VDL, temporal VDL and spatial VDL. Based on the comparison, the method adjusts the encoding bitrate, the overall encoding complexity, temporal encoding complexity and spatial encoding complexity of the input video and encodes the input video with the adjusted encoding bitrate, overall encoding complexity, temporal encoding complexity and spatial encoding complexity of the input video.

27 Claims, 7 Drawing Sheets

(56) References Cited

OTHER PUBLICATIONS

Ivanov, Y., et al., "Dynamic Complexity Scaling for Real-Time H.264/AVC Video Encoding", ACM Multimedia'07, Sep. 23-28, 2007, pp. 962-970.

Alfonso, D., "Proposals for video coding complexity assessment," In Joint Collaborative Team on Video Coding (JCT-VC) of ITU-T SG16 WP3 and ISO/IEC JTC1/SC29/WG11, Apr. 15-23, 2010, pp. 1-10.

Andreopoulos, Y., et al., "Adaptive linear prediction for resource estimation of video decoding," IEEE Transactions on Circuits and Systems for Video Technology, Jun. 2007, pp. 751-764, vol. 17, No. 6.

Chen, Z., et al., "Recent advances in rate control for video coding," Signal Processing: Image Communication, Jan. 2007, pp. 19-38, vol. 22, Elsevier.

Da Fonseca, T. A., et al., "Complexity-scalable h.264/avc in an ipp-based video encoder," In Proceedings of 2010 IEEE 17th International Conference on Image Processing, Sep. 26-29, 2010, pp. 2885-2888.

Joshi, R., et al., "Efficient large size transforms for high-performance video coding," In Society of Photo-Optical Instrumentation Engineers (SPIE) Conference Series, 2010, 7 pages, vol. 7798.

Marpe, D., et al., "Video Compression Using Nested Quadtree Structures, Leaf Merging, and Improved Techniques for Motion Representation and Entropy Coding," IEEE Transactions on Circuits and Systems for Video Technology, Dec. 2010, pp. 1676-1687, vol. 20, No. 12.

Mastronarde, N., et al., "A scalable complexity specification for video applications," In 15th IEEE International Conference on Image Processing, 2008, pp. 2576-2579.

Merrit, L., et al., Improved rate control and motion estimation for h.264 encoder. In ICIP, 2007, vol. 5, pp. 309-312.

Picard, R.R., et al., "Cross-validation of regression models," Journal of the American Statistical Association, Sep. 1984, pp. 575-583, vol. 79, No. 387.

Regunathan, S., J., et al., A generalized video complexity verifier for flexible decoding. In IEEE International Conference on Image Processing, 2003, pp. 289-292.

Vanam, R., et al., "H. 264/MPEG-4 AVC encoder parameter selection algorithms for complexity distortion tradeoff," In IEEE Data Compression Conference, DCC'09, 2009, pp. 372-381.

Vetrivel, S., et al., "An Overview of H. 26x Series and Its Applications," International Journal of Engineering Science and Technology, 2010, pp. 4622-4631, vol. 2, No. 9.

Wiegand, T., et al., "Overview of the h.264/avc video coding standard," IEEE Trans. Circuits System Video Technology, Jul. 2003, pp. 560-576, vol. 13, Issue 7.

Wiegand, T., et al., "Overview of the h.264/avc video coding standard," IEEE Trans. Circuits System Video Technology, 2003, pp. 560-576, vol. 13, Issue 7.

* cited by examiner

| Videos | M | $B_t$ | $k$ | $B_a$ |
|---|---|---|---|---|
| Mobile | 176x144 | 100 | 0.50 | 91.53 |
| Flower | 352x288 | 300 | 0.75 | 293.95 |
| Tennis | 352x240 | 300 | 0.66 | 291.84 |
| Parkrun | 640x360 | 600 | 0.80 | 622.16 |
| Harbour | 704x576 | 1500 | 0.69 | 1457.02 |
| Parkrun | 1280x720 | 2500 | 1.05 | 2534.98 |
| Pedestrian | 1920x1080 | 3500 | 0.82 | 3313.23 |

FIG. 5

RATE-DISTORTION-COMPLEXITY OPTIMIZATION OF VIDEO ENCODING GUIDED BY VIDEO DESCRIPTION LENGTH

BACKGROUND OF THE INVENTION

The invention relates generally to video hosting systems, and more particularly to a video coding system for transcoding of videos with optimized visual quality under encoding time and bitrate constraints.

Video hosting services, such as YOUTUBE, allow users to post videos. Most video hosting services transcode an original source video from its native encoded format (e.g., MOV) into one or more output formats (e.g., ADOBE FLASH or Windows Media Video (WMV)). Transcoding comprises decoding the source video from the native format into an unencoded representation using a video codec for the native format and then encoding the unencoded representation with video codecs for the output formats. Transcoding can be used to reduce storage requirements, and also to reduce the bandwidth requirements for serving the video to clients.

One challenge in designing a video coding system for video hosting services with millions of videos is to transcode and to store the videos with acceptable visual quality and at a reasonable computing cost. A particular problem is the efficient allocation of coding bits and computations to achieve an optimized rate-distortion (R-D) and computing time of a source video. Generally, given a target resolution and frame rate, a video's visual quality is determined by its encoding bitrate computed using a rate control algorithm. Conventional video encoding systems use a variety of encoding strategies to obtain an optimized rate-distortion of a source video, including one-pass and multi-pass Average Bitrate Encoding (ABR), Constant Bitrate Encoding (CBR), Constant Quantizer Encoding (CQP) and Constant Rate Factor Encoding (CRF).

Conventional encoding strategies fail to provide encoded videos with constant visual quality while meeting the bitrate constraint associated with the videos and do not optimize bitrate, distortion and complexity jointly. For example, an ABR encoding strategy uses scaling factors, and long-term and short-term compensation to achieve a target bitrate and to meet network bandwidth constraint. But the visual quality of ABR encoding may fluctuate when video scenes change. A CBR encoding strategy is designed for real-time streaming with constant bitrate, which is controlled by a storage buffer with a fixed size. CBR provides the highest encoding speed but the lowest R-D performance among the above-mentioned conventional encoding strategies. A CQP encoding strategy maintains a constant quantizer and compresses every frame using the same quantization parameter (QP). CQP may cause temporal perceptual fluctuation of encoded videos, especially when it uses large quantizers on videos with intensive scene changes. A CRF encoding strategy aims to achieve a constant visual quality with a constant rate factor. CRF encodes a video with a nominal quantizer, but increases the QP when a scene has a lot of action and motion and vice versa. The disadvantage of CRF encoding is that the output video file size is unpredictable due to the varying scenes in the video content. Thus, it is hard to choose appropriate constant rate factor values to meet a required bitrate constraint of a network or storage system.

SUMMARY

A method, system and computer program product provides optimized transcoding of videos with constant quality and bitrate constraints guided by video description lengths for video hosting services.

In one embodiment, the method obtains, for an input video measures of overall complexity, temporal complexity, and spatial complexity, and compares the overall complexity, temporal and spatial complexity measures with reference complexity, temporal and spatial complexity measures. The measures of complexity (overall, temporal and spatial) of the input video are represented by certain video description length (VDL) of the input video. VDL is the bitrate needed to encode the video at certain visual quality. An overall VDL indicates the overall content complexity of the input video. The temporal VDL of the input video reflects the temporal complexity of the video. The spatial VDL of the input video reflects the spatial complexity of the video. Based on the comparison, the method adjusts the overall encoding complexity, temporal and spatial encoding complexity of the input video and encodes the input video with the adjusted overall encoding complexity, temporal and spatial encoding complexity of the input video.

Encoding the input video with the adjusted overall encoding complexity, temporal and spatial encoding complexity of the input video can be further enhanced by using a trained CRF reference bitrate model and a revised CRF-bitrate model. The CRF reference bitrate model is trained on a large corpus of videos to model the relationship between CRF values and the average bitrate of CRF encoding. The revised CRF-bitrate model is adapted to encode the input video with optimization.

Another embodiment includes a computer system that comprises a video description length module and a transcoding module for optimizing encoding bitrate, distortion and complexity of an input video. A further embodiment includes a non-transitory computer-readable medium that stores executable computer program instructions for compressing images in the manner described above.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF THE FIGURES

FIG. 5 is example data of adjusting factor, target bitrate, actual bitrate of a revised CRF-bitrate model for example videos.

The figures depict various embodiments of the invention for purposes of illustration only, and the invention is not limited to these illustrated embodiments. One skilled in the art will readily recognize from the following discussion that alternative embodiments of the structures and methods illustrated herein may be employed without departing from the principles of the invention described herein.

DETAILED DESCRIPTION

I. System Overview

Figure 1:
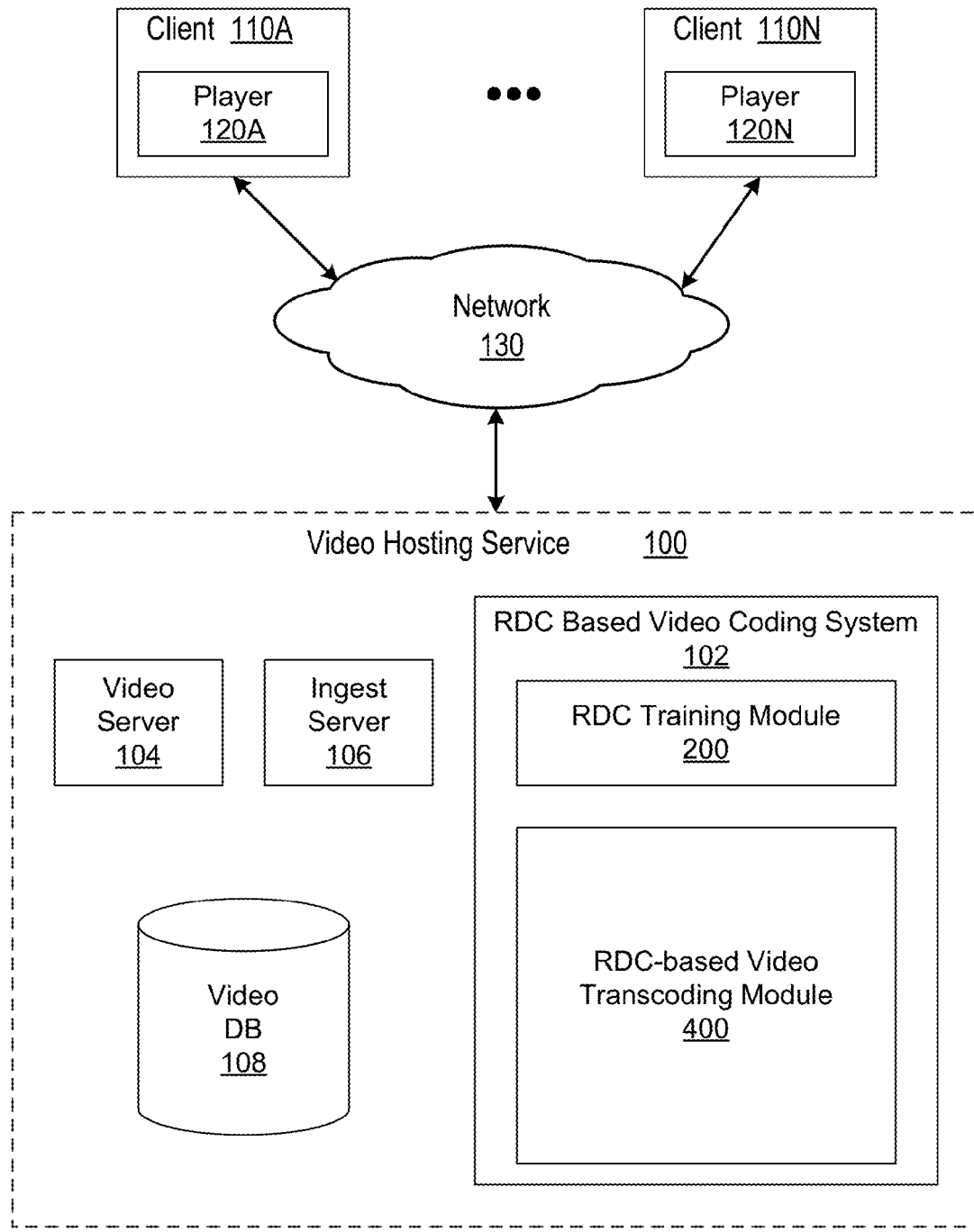
FIG. 1 is a block diagram illustrating a system view of a video hosting service having a video coding system with rate-distortion-complexity (RDC) optimization.

FIG. 1 is a block diagram illustrating a system view of a video hosting service 100 having a rate-distortion-complexity (RDC) based video coding system 102. Multiple users/viewers use client 110A-N to send video hosting requests to the video hosting service 100, such as uploading videos to a video hosting website, and receive the requested services from the video hosting service 100. The video hosting service 100 communicates with one or more clients 110A-N via a network 130. The video hosting service 100 receives the video hosting service requests from clients 110A-N, transcodes source videos by the RDC based video coding system 102 and returns the transcoded source videos to the clients 110A-N. The video hosting service 100 may reside within a cloud computing network.

Turning to the individual entities illustrated on FIG. 1, each client 110 is used by a user to request video hosting services. For example, a user uses a client 110 to send a request for uploading a video for sharing, or playing a video. The client 110 can be any type of computer device, such as a personal computer (e.g., desktop, notebook, laptop) computer, as well as devices such as a mobile telephone, personal digital assistant, IP enabled video player. The client 110 typically includes a processor, a display device (or output to a display device), a local storage, such as a hard driver or flash memory device, to which the client 110 stores data used by the user in performing tasks, and a network interface for coupling to the video hosting service 100 via the network 130.

A client 110 also has a video player 120 (e.g., the Flash™ player from Adobe Systems, Inc., or the like) for playing a video stream. The video player 120 may be a standalone application, or a plug-in to another application such as a network browser. The player 120 may be implemented in hardware, or a combination of hardware and software. All of these implementations are functionally equivalent in regards to the invention. The player 120 includes user interface controls (and corresponding application programming interfaces) for selecting a video feed, starting, stopping, and rewinding a video feed. Also, the player 120 can include in its user interface a video display format selection configured to indicate which video display format (e.g., a standard definition TV or a high-definition TV). Other types of user interface controls (e.g., buttons, keyboard controls) can be used as well to control the playback and video format selection functionality of the player 120.

The network 130 enables communications between the clients 110 and the video hosting service 100. In one embodiment, the network 130 is the Internet, and uses standardized internetworking communication technologies and protocols, known now or subsequently developed that enable the clients 110 to communicate with the video hosting service 100.

The video hosting service 100 comprises a RDC based video coding system 102, a video server 104, an ingest server 106 and a video database 108. The ingest server 106 receives user uploaded videos and stores the videos in the video database 108. The video server 104 serves the videos from the video database 108 in response to user video hosting service requests. The video database 108 stores user uploaded videos and videos transcoded by the RDC based video coding system 102. In one embodiment, the video database 108 stores a large video corpus (e.g., 20,000 user uploaded videos) for the RDC based video coding system 102 to train rate-distortion-complexity optimization models.

The RDC based video coding system 102 comprises a RDC training module 200 and a RDC-based video transcoding module 400. The RDC training module 200 trains a constant rate factor (CRF) bitrate model and an encoding computation profile (ECP) mapping module offline from videos stored in the video database 108. As explained further below, the RDC-based video transcoding module 400 transcodes a given source video with a video description length (VDL) guided constant quality video encoding strategy under bitrate constraint with RDC optimization. The RDC optimization is achieved by finding RDC optimal encoding strategies for each encoding complexity levels with Pareto Optimal Set via the CRF bitrate model and the ECP mapping module. As a beneficial result, a source video is transcoded to an output video that has an optimized visual quality under bitrate constraints associated with the target output video formats of the source video.

Figure 2:
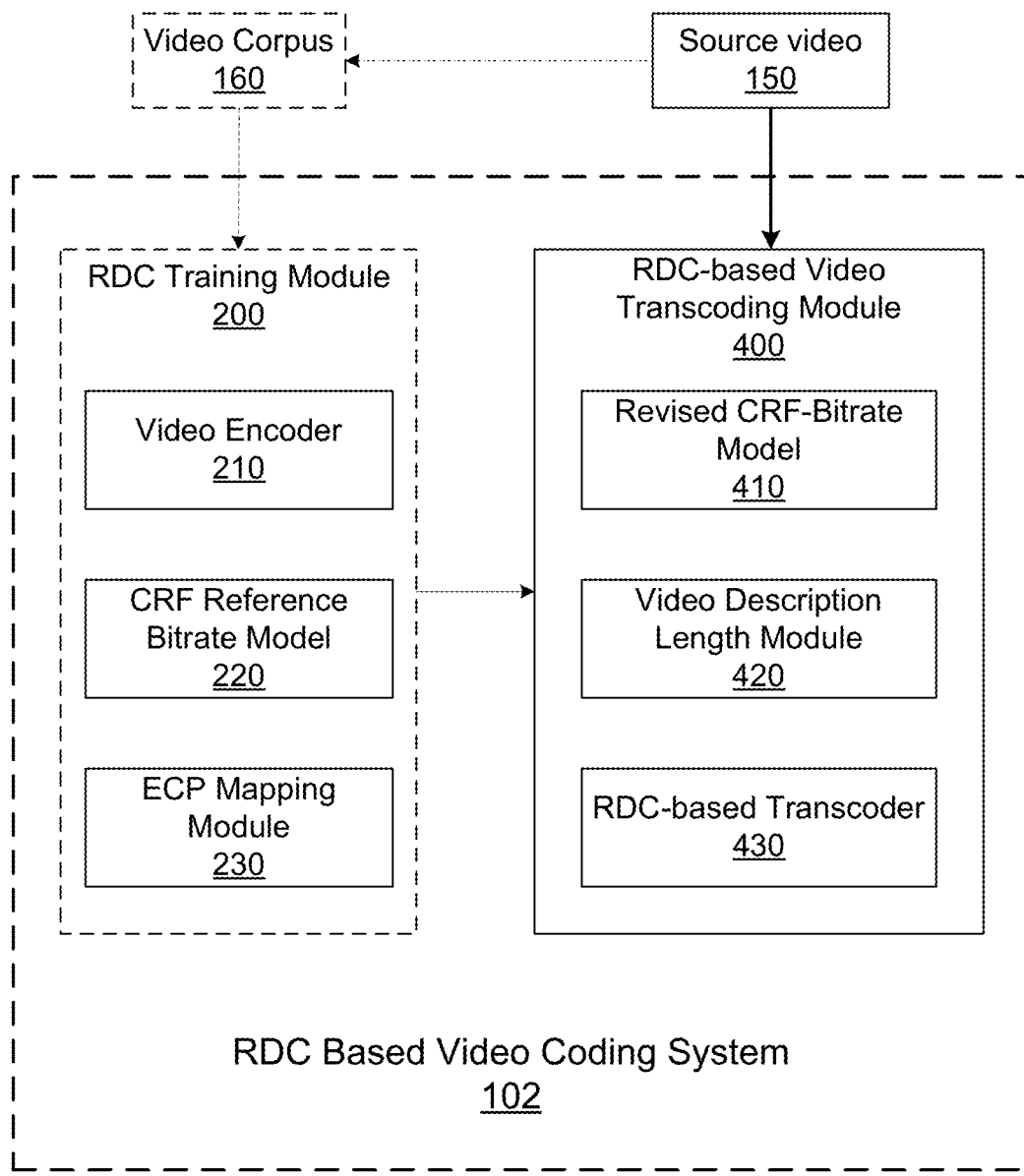
FIG. 2 is a flow diagram illustrating a video description length guided constant quality video encoding strategy under bitrate constraint with RDC optimization.

To further illustrate the system operation of the video hosting service 100, FIG. 2 is a flow diagram illustrating of the RDC based video coding system 102 within the video hosting service 100. A user sends a request to the video hosting service 100 for uploading a source video 150. The RDC based video coding system 102 receives the source video 150 in its native format and processes the source video 150 by the RDC-based video transcoding module 400. The source video 150 in its native format has multiple video encoding parameters and video source information including, e.g., frame rate, spatial resolution and bitrate.

The source video 150 can be also stored in a video database (e.g., video database 108 of FIG. 1) and becomes a part of the video corpus 160 stored in the video database. The video corpus 160 is processed by the RDC training module 200. In one embodiment, the RDC training module 200 comprises a video encoder 210, a CRF reference bitrate model 220 and an ECP mapping module 230. The RDC training module 200 encodes the videos in the video corpus 160 using CRF encoding and trains the CRF reference bitrate model 220 and ECP mapping module 230 on the video corpus 160 off-line. The CRF reference bitrate model 220 models the relationship between constant rate factor and bitrate of the CRF encoding. The ECP mapping module 230 maps computation complexity levels from CRF encoding to encoding computation profiles and number of encoding passes.

The RDC-based video transcoding module 400 transcodes the source video 150 guided by the CRF reference bitrate model 220 and ECP module 230 of the RDC training module 200. In one embodiment, the RDC-based video transcoding module 400 comprises a revised CRF-bitrate model 410, a video description length module 420 and a RDC-based transcoder 430. The revised CRF-bitrate model 410 describes the relationship between the constant rate factor and the actual bitrate to encode the source video 150. The revised CRF-bitrate model 410 is revised based on the CRF reference bitrate model 220 for encoding an input video. The video description length model 420 describes computation complexity including overall, temporal and spatial content complexity of encoding the source video 150. The RDC-based video transcoding module 400 transcodes the source video 150 based on the relationships between the constant rate factor and the actual bitrate and the computation complexity represented by the video description length of the source video 150.

II. Modeling Video Bitrate-Quality Relationship: CRF Reference Bitrate Model

CRF encoding strategy aims to achieve a constant visual quality of encoding a video using a constant rate factor. Generally, the CRF selected for a video represents a desired visual quality level to encode the video in one encoding pass. A large CRF value for encoding a video results in a large quantization parameter ("QP"), high compression ratio, and thus low visual quality. A small CRF results in a small QP, low compression ratio, and thus high visual quality. A CRF value of zero means lossless compression, and thus the highest visual quality. The CRF encoding compresses different frames of a video differently by dynamically adjusting the QP according to the amount of motion in the video frames.

The video compression performance using CRF encoding can be modeled by a CRF reference bitrate model (e.g., the CRF reference bitrate model 220 of FIG. 2), where video compression quality can be represented by suitable CRF values. Using a trained CRF reference bitrate model, the RDC-based video coding system 102 selects an appropriate CRF value for a source video, which enables the actual bitrate used in encoding the source video to be close to the target bitrate associated with the target output video format of the source video. Further, a trained CRF reference bitrate model provides an indication on how much average bitrate is needed to encode a video using a CRF encoding strategy. The actual bitrate to encode the source video with CRF obtained from the trained CRF reference bitrate can be used to revise a CRF-bitrate model when encoding a given source video to achieve constant visual quality within the bitrate constraint associated with the target output video format of the source video.

Using the RDC training module 200 of FIG. 2 as an example, the RDC training module 200 trains the CRF reference bitrate model 220 on the videos in the video corpus 160. The video corpus 160 stores a large number of multi-scene video sequences with multiple spatial resolutions, frame rates and bitrates. The video encoder 210 of the RDC training module 200 encodes each video selected from the video corpus 160 with a pre-selected CRF value using CRF encoding and obtains an actual bitrate from the encoding. Any existing video encoding scheme known to those of ordinary skill in the art can be used by the video encoder 210 to encode the video. In one embodiment, the video encoder 210 is a x.264 video encoder that encodes a selected video into H.264/MPEG-4 AVC format. Other embodiments of the video encoder 210 may use a VP8 encoder or other available video encoders.

The CRF reference bitrate model 220 uses (crf, bitrate) pairs from encoding the videos in the video corpus 160 as training samples to model the relationship between CRF and bitrate of CRF encoding. The relationship between CRF and average bitrate of a video of a video corpus is dependent on the spatial resolution, the temporal resolution of the video and encoding algorithm, which is fixed in default x.264 CRF encoding. The relationship between an average bitrate and spatial resolution, temporal resolution and CRF is described as following:

$$B = f(crf, M, T), \quad (1)$$

where B is the average bitrate, M is the number of pixels of luminance component of a frame of the video, i.e., the spatial resolution and T is the number of frames per second, i.e., the temporal resolution. Since parameter crf, M and T are mostly independent of each other, the average bitrate described in Equation (1) can be represented as following:

$$B = f_1(crf) \times f_2(M) \times f_3(T). \quad (2)$$

The CRF reference bitrate model 220 represents the fitting samples as quads (crf, M, T, B) found by a least square method.

For average performance of video encoding that encodes single scene and multi-scene videos, the CRF reference bitrate model 220 weighs the resulting bitrate from encoding a video by the number of scenes in the video and normalizes the bitrate by the total number of scenes in a selected number of training videos as follows:

$$B = \frac{\sum_i B_i \times S_i}{\sum_i S_i} \quad (3)$$

where B is the average bitrate, $B_i$ is the actual bitrate encoding the ith video, and $S_i$ is the number of scenes in the ith video. The residual error of the model is $r_i = B_i - f(crf_i, M_i, T_i)$. The fitness of the CRF reference bitrate model 220 is evaluated by the Sum of Square Error (SSE) and the Root of Mean Square Error (RMSE) as following:

$$SSE = \sum_{n=1}^{n} r_i^2 \quad (4)$$

$$RMSE = \sqrt{\frac{\sum_{i=1}^{n} r_i^2}{n}} \quad (5)$$

where $r_i$ is the residual error, and n is the number of fitting samples.

Generally, temporal resolution is evaluated by frame rate in the unit of frame per second (fps). To study the temporal resolution effect on the CRF reference bitrate model 220, the videos selected for training the CRF reference bitrate model 220 are downsampled along temporal axis, and the downsampled videos are encoded with half of the original frame rate of the videos. In this manner, an original video and its downsampled version has the same display time. The CRF reference bitrate model 220 is trained to obtain the average bitrate on videos with respect to each spatial resolution, e.g., fps=12.5 and fps=25, fps=15 and fps=30.

The training result shows that bitrate almost increases linearly with encoding frame rate (fps), in other words, $$\frac{B_1}{B_2} = \frac{fps_1}{fps_2}. \quad (6)$$

Based on the linear relationship shown in Equation (6), the relationship between average bitrate and frame rate can be described as following:

$$y = a \times T, \quad (7)$$

where parameter a includes the influence from spatial resolution and CRF.

Figure 7:
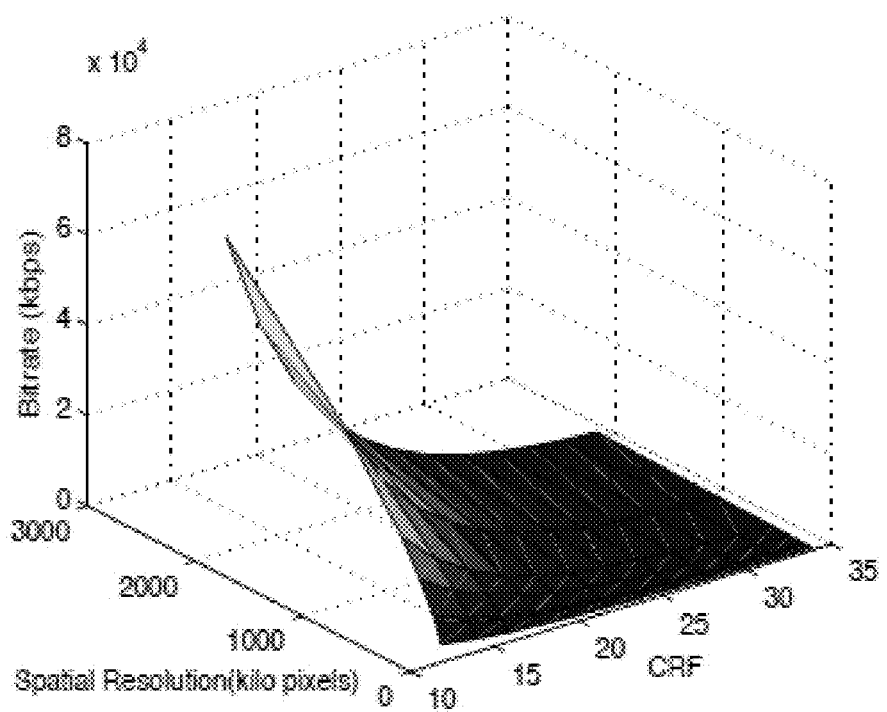
FIG. 7 is example data of average bitrate with respect of constant rate factors (CRF) and spatial resolution for training a CRF reference bitrate model.

FIG. 7 illustrates an exemplary training result of the CRF reference bitrate model 220 with a fixed frame rate (i.e., fps=25). The training result illustrated in FIG. 7 further shows that the average bitrate is an approximate power function of the spatial resolution when fixing CRF value and the average bitrate, and is an approximate exponential function of CRF when fixing the spatial resolution. When frame rates are other than fps=25, the model can be scaled by a factor of fps/25.

One embodiment of training the CRF reference bitrate model 220 is using a frame rate fps=25.

To explore the relationship between average bitrate and spatial resolution M described in Equation (4), the CRF reference bitrate model 220 is trained on simulated/derived videos with hierarchical spatial resolution obtained by low-pass filtering and downsampling on the original videos. For example, the video encoder 210 applies a low-pass filter to the original videos with spatial resolution 704×576 for anti-aliasing. The video encoder 210 downsamples these videos to obtain lower resolution versions of the videos having sizes 352×288 and 176×144. The video encoder 210 encodes the original 704×576 videos and their downsampled lower resolution versions with the same CRF values to determine the relationship between bitrate and the spatial resolution with respect to each CRF value. The training result shows that the bitrate-spatial resolution polylines corresponding to different CRF values are nearly parallel. The bitrate increasing rate when decreasing CRF values is gradually decreasing along with the increase of the spatial resolution. The CRF reference bitrate model 220 is further trained with videos having a variety of spatial resolutions and the training result shows similar relationship among bitrate, spatial resolution and CRF values as the one for simulated videos.

Based on the training result, the CRF reference bitrate model 220 models the relationship between average bitrate and spatial resolution as follows:

$$y = b \times x^c, \qquad (8)$$

where $0 < c < 1$ for each CRF value. Function $y = b \times x^c$ passes the origin of the coordinate frame, which implies that zero spatial resolution leads to zero bitrate. $0 < c < 1$ indicates the monotonic increasing relationship between bitrate and the spatial resolution, and average bitrate has smaller increasing rate than spatial resolution because videos with higher spatial resolution have more effective infra and inter prediction in motion estimation. In one embodiment, the parameter c is averaged to be 0.65 when fitting on the training samples. The parameter b for each CRF value can be obtained from modeling the mapping between average bitrate and spatial resolution using the power function described in Equation (8).

CRF values can take floating-point values. In one embodiment, the CRF values are in the range [0, 51] for x.264 CRF encoding. CRF=0 is for lossless encoding, and CRF=51 is for lossy compression with the smallest file size and the smallest peak-signal-to-noise-ratio (PSNR). Using floating-point CRF values to train the CRF reference bitrate model 220, only CRF value is changed and the other encoding parameters (e.g., frame rate) are fixed by default for encoding videos to certain target spatial and temporal resolution. Sample CRF values of 12, 14, . . . , and 34 are used to encode videos into PSNR of 28-55 dB with visually acceptable and satisfactory compression quality.

The relationship between average rate and CRF under certain spatial and temporal resolution can be described in Equation (9) below:

$$y = m \times e^{nx}. \qquad (9)$$

To model the Equation (9), parameter m is set to be 1380 and parameter n is set to be −0.20. The fitting error is evaluated by SSE=540.3 and RMSE=7.351. The average bitrate B and CRF relationship (crf, M, T, B) described in Equation (4) can be represented by Equation (10) below:

$$B = f_1(crf) \times f_2(M) \times f_3(T) \qquad (10)$$
$$= m \times e^{n \cdot crf} \times M^c \times \frac{T}{25}$$
$$= 1380 \times e^{-0.2 crf} \times M^{0.65} \times \frac{T}{25}.$$

Given that videos are often encoded with a default frame rate, neglecting parameter T obtains the modified Equation (10) as the following:

$$B = f_1(crf) \times f_2(M) = m \times e^{n \cdot crf} \times M^c. \qquad (11)$$

Accordingly, CRF can be obtained from bitrate B using Equation (12) below:

$$crf = f_1^{-1}\left(\frac{B}{f_2(M) \times f_3(T)}\right) \qquad (12)$$
$$= 5 \times \ln\left(\frac{55.2 \times M^{0.65} \times T}{B}\right).$$

The relative fitting error is evaluated per spatial resolution by the Equations below:

$$E_r(M) = \frac{|B_a^A(M) - B_e^A(M)|}{B_a^A(M)}, \qquad (13)$$

where $$B_e^A(M) = \frac{\left(\sum_{crf=12}^{34} \sum_{video \in \Omega_M} B_i(crf, M)\right)}{|\Omega_M| \times 12}. \qquad (14)$$

M is the spatial resolution, $B_a^A(M)$ is the actual bitrate averaged on CRF of videos with spatial resolution M, $\Omega_M$ is the video set with spatial resolution M and $|\Omega_M|$ is the cardinality of $\Omega_M$. $E_r$ stands for the relative error, $B_a^A(M)$ stands for the average actual bitrate, and $B_e^A(M)$ stands for the bitrate estimated from Equation (10).

III. Video Encoding Using a Revised CRF-Bitrate Model

To encode an input video with a CRF obtained from the trained CRF reference bitrate model 220, the actual bitrate from encoding the input video may deviate from the target bitrate associated with the input video. A revised CRF-bitrate model between CRF and actual bitrate is needed to adjust the actual bitrate towards the target bitrate for encoding an input video. In one embodiment, the RDC-based video transcoding module 400 uses the revised CRF-bitrate model 410 to adapt CRF values to encode an input video. The revised CRF-bitrate model 410 can be revised using Equation (15) below:

$$B = k \times f_1(crf) \times f_2(M) = k \times m \times e^{n \cdot crf} \times M^c, \qquad (15)$$

where k is a revising factor associated with an input video to be encoded.

To further illustrate the revision, the revised CRF-bitrate model 410 first obtains a CRF from the mapping between CRF and average bitrate described in Equation (12) by substituting parameter B with the target bitrate associated with the input video. The resulting actual bitrate of encoding the input video and its corresponding CRF, i.e., (actual bitrate, CRF), is used to determined the revising factor k of Equation (15) as the following:

$$k = \frac{B}{m \times e^{n \cdot crf} \times M^c}. \quad (16)$$

FIG. 5 is exemplary data of adjusting factor k, target bitrate $B_t$, actual bitrate $B_a$ for example video sequences, where parameter M represents the spatial resolution of a video sequence.

Using the trained CRF reference bitrate model 220 and the revised CRF-bitrate model 410, the RDC based video transcoding module 400 can encode an input video with constant visual quality within the bitrate constraint associated with the input video. The following algorithm represents one embodiment of encoding an input video with constant visual quality within the bitrate constraint associated with the input video.

//*INPUT: an uncompressed video and its target bitrate $B_t$
//*OUTPUT: a compressed video with constant visual quality within its target bitrate
1: Find $crf_t$ from the CRF reference bitrate model 220 in Equation (12) by substituting parameter B with $B_t$;
2: Encode the video with $crf_t$ and obtain the actual bitrate $B_a$;
3: Obtain the revised CRF-bitrate model 410 in Equation (15) by ($crf_t, B_a$) pair;
4: Find $crf_a$ from the revised CRF-bitrate model of Equation (15) by substituting B with $B_t$;
5: Encode the video with $crf_a$ and obtain the revised actual bitrate $B_a'$;
6: If $B_a'$ is not close to $B_t$, repeat step 3 until convergence.

The algorithm described here is one type of multi-pass CRF encoding with CRF values evaluated from the trained and revised CRF-bitrate models. The convergence criterion in step 6 is that the difference between the actual bitrate $B_a'$ and the target bitrate $B_t$ falls in ±10% of the target bitrate.

Figure 4:
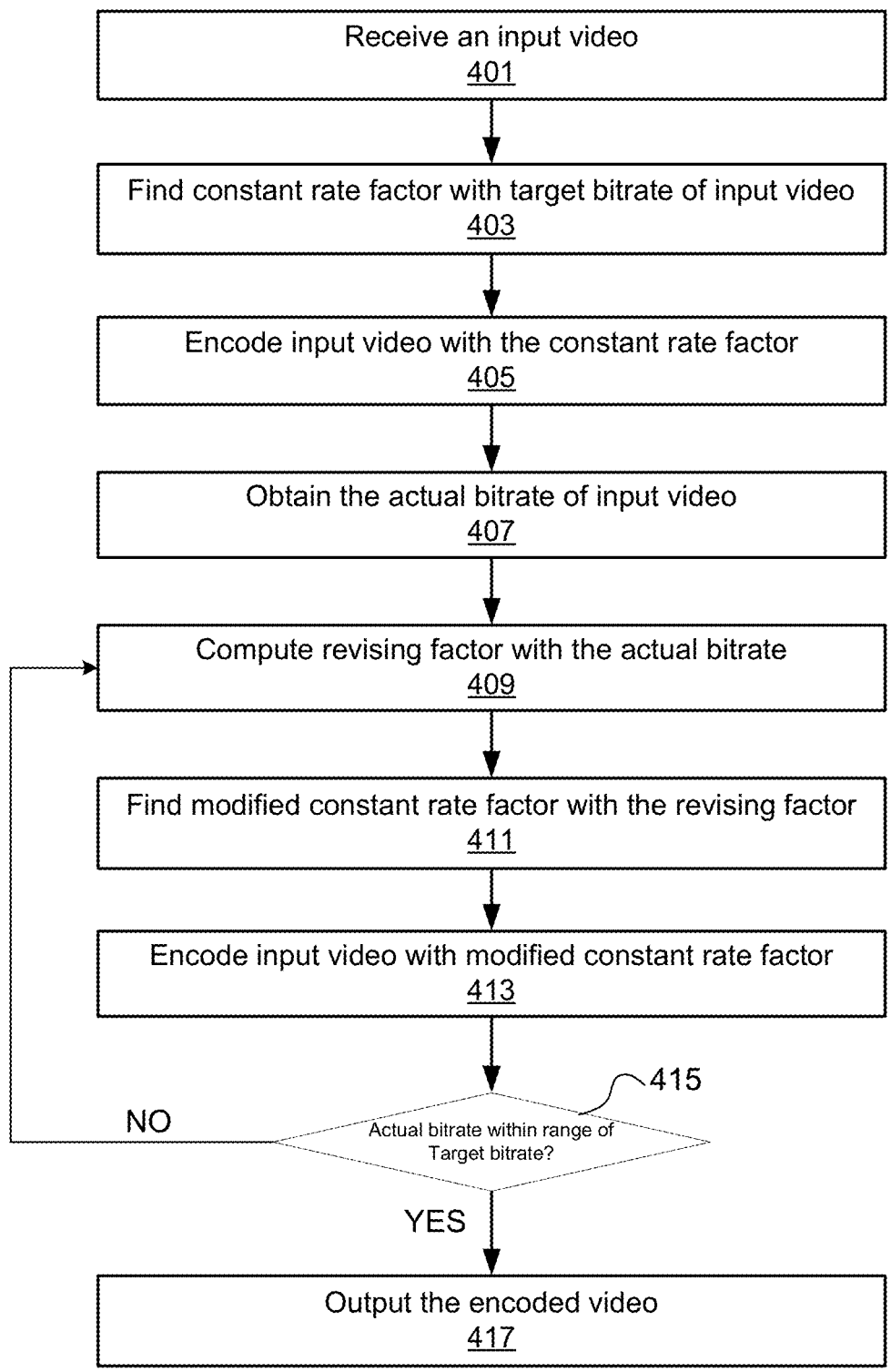
FIG. 4 is a flow chart of encoding step of a multi-pass constant quality video encoding strategy under bitrate constraint.

FIG. 4 is a flow chart of the encoding an input video into an output video having constant visual quality within the target bitrate. Initially, the RDC-based video transcoding module 400 receives 401 an input video and the input video has a target bitrate as the bitrate constraint for encoding the input video. In one embodiment, the target bitrate of the input video is associated with the target output video format of the input video. In another embodiment, the target bitrate of the input video is revised based on the video description length (VDL) analysis described below. The video transocoding module 400 finds 403 a constant rate factor with respect to the target bitrate of the input video (e.g., using Equation (12) with the target bitrate substituting the average bitrate parameter B). The transcoding module 400 encodes 405 the input video with obtained CRF and obtains 407 the actual bitrate for encoding the input video. The video transocding module 400 computes 409 a revising factor with the actual bitrate (e.g., using Equation (15)) and finds 411 a modified constant rate factor with the revising factor. The video transcoding module 400 encodes 413 the input video with the modified constant rate factor and determines 415 whether the actual bitrate from the encoding 413 is within the range of the target bitrate. Responsive to the actual bitrate being within the range of the target bitrate, the video transcoding module 400 outputs 417 the encoded video. Responsive to the actual bitrate not being within the range of the target bitrate, the video transcoding module 400 repeats the operation steps 409 to 417.

Encoding an input video towards the target bitrate associated with the input video, the testing results show that the number of encoding passes is 1.8 in average. If the input video has content complexity close to the average, one pass CRF encoding with CRF value found by the CRF reference bitrate model 220 will encode the video towards the target bitrate. If the input video has content complexity deviating from the average, multi-pass CRF encoding is needed with CRF values found by the adaptively revised CRF-bitrate model 410.

IV. Encoding Computation Profile (ECP)

Varying contents in scenes captured by video sequences lead to various amount of information contained in the video sequences. Given a large video corpus of a video hosting service, applying same encoding bitrate to different video content leads to different video qualities. Furthermore, the video hosting service 100 serves a variety of video output formats for each video uploaded to the video hosting service 100. Different output formats have different video processing goals in terms of target playback platforms (e.g., mobile phone and high definition TV), delivery constraints (e.g., real time video streaming and video on-demand) and user expectations.

One solution to transcode videos having a variety of video formats and content complexity is to apply different bitrate control strategies to different videos. In one embodiment, the RDC based video coding system 102 chooses at least one of the three different bitrate control strategies and encoding parameters for a given video output format:
control_bitrate,
control_quality,
control_quality_bounded_bitrate.

A control_bitrate strategy is to achieve the actual bitrate of encoding a video as close as possible to the target bitrate of the video. This bitrate control strategy is suitable for mobile video streaming and video streaming using dial-up Internet connections.

A control_quality strategy is to achieve a constant target visual quality irrespective of the bitrate required to achieve it. Control_quality strategy is used for encoding videos with varying complexity faces varying actual bitrates, e.g., high bitrate for encoding complex videos and low bitrate for simple videos. This bitrate control strategy is suitable for video processing and streaming in a distributed video processing environment and for high visual coding quality transcoding (e.g., lossless coding quality).

A control_quality_bounded_bitrate strategy is to achieve a constant target visual quality as much as possible while maintaining an upper bound on the bitrate. Thus, the visual quality is allowed to degrade below the target quality level only for complex videos where this quality is unachievable within the allocated maximum bitrate constraint. For simpler videos, the bitrate can be lower than this maximum bitrate as long as the desired target quality level is achieved.

To further improve video transcoding performance, the RDC based video coding system 102 supports graded computation levels for a transcoder using a given bitrate control strategy. Specifically, for a bitrate control strategy (e.g., control_quality_bounded_bitrate strategy), there may be, e.g., five different encoding computation levels supported by the RDC based video coding system 102:

Fastest:
Provides the fastest transcoding time, but does not necessarily produce the most compact output bit-stream or the highest visual quality for the same bitrate. For most bitrate control strategies and output formats, one-pass encoding is conducted.

Fast:
Provides a reasonably fast encoding. For most bitrate control strategies and output formats, one-pass encoding is conducted.

Medium:

Provides an encoding-time versus encoding efficiency trade-off that is suitable for most bitrate control strategies and output formats.

Slow:

Uses more computationally expensive tools for encoding in order to produce transcoded videos at higher encoding efficiency, i.e., higher visual quality at the same bitrate. For example, video codec x.264 sets compression efficiency control parameter "preset=slower" or "preset=placebo" to encode videos with high visual quality.

Slowest:

Uses computationally demanding and sophisticated tools for encoding in order to produce the most compact output bit-stream and the highest perceptual quality video, such as movie studio quality videos. When measured in terms of PSNR, the visual quality at this encoding computation level may be equal or lower than that achieved by the SLOW mode.

With a number of encoding computational levels available for a transcoder, the RDC based video coding system 102 implements various transcoding policies to adapt the encoding computation levels depending on factors such as current system load on servers in a network (e.g., cloud computing network), demand for live streaming or allowable transcoding latency. For example, multiple initial streaming transcoding can be conducted at a low computational level to reduce latency for live video streaming. A video streaming rerun, on the other hand, can be conducted with a higher computational level with acceptable latency, where the rerun is to respond to the increased popularity of the video.

To optimize the various bitrate control strategies and to support the graded encoding computation levels for each bitrate control strategy, the RDC based video coding system 102 follows a systematic procedure which not only evaluates multiple ways of implementing different bitrate control strategies, but also considers the optimal allocation of computation for each bitrate control strategy. In one embodiment, the RDC-based video coding system 102 trains an encoding computation profile (ECP) mapping module 230 to model the computation-efficiency trade-off in a fine-grained manner.

ECP is a computational complexity allocation control parameter which could be easily integrated in x. 264 encoding. The ECP parameter takes a floating-point value between 0 and 1 and can be used to fine tune the trade-off among bitrate, distortion and computation complexity. Existing bitrate control strategies focus on trade-off between rate and distortion of video encoding. However, when computation of encoding is considered as a criterion for evaluating encoding efficiency, the trade-off between rate and distortion needs to be adjusted together with the computation of encoding.

For example, in a two-pass encoding scheme, the first encoding pass is typically conducted faster than the second one because the first encoding pass is used to obtain some statistic information of the video. The overall two-pass encoding generally consumes higher computations than an one-pass encoding scheme. However, it is not obvious whether an one-pass encoding with high computational complexity is more efficient or less efficient than a two-pass encoding with less computational complexity. The ECP mapping module 230 of the RDC-based video coding system 102 is designed to find the optimal allocation of computation for multi-pass based video transcoding (e.g., x.264 based multi-pass transcoding), as well as number of encoding passes for a given encoding computation level.

Turning now to FIG. 2, the ECP mapping module 230 of the RDC training module 200 is trained on the videos stored in the video corpus 160. For each encoding strategy, the ECP mapping module 230 is trained over different possible implementations and different possible computation levels for multi-pass transcoding to obtain raw rate-distortion-complexity data. The ECP mapping module 230 is further optimized, for example, using a multi-criteria Pareto optimal set analysis on the raw rate-distortion-complexity data to derive the best transcoding implementation and computation allocation for each of the bitrate control strategy at multiple equally spaced encoding computation levels (e.g., in one embodiment, there may be five encoding computation levels: FASTEST, FAST, MEDIUM, SLOW and SLOWEST computation levels).

Taking multi-pass x.264 transcoding as an example, the ECP mapping module 230 represents the computation allocation for a two-pass encoding by a pair $\{ecp_0, ecp_1\}$. $ecp_0$ represents the computational complexity of one-pass bitrate encoding or a first pass of a two-pass bitrate encoding. $ecp_1$ represents the computational complexity of a second pass of a two-pass bitrate encoding. For example, $\{0.07, \text{NULL}\}$ represents the computational complexity of one-pass bitrate encoding implementation, and $\{0.07, 0.71\}$ is an example computational complexity of a two-pass bitrate encoding implementation.

For each bitrate control strategy, ECP mapping module 230 is trained offline on a set of videos from the video corpus 160. Each training sample is associated with a rate-distortion-complexity performance, a $\{R, D, C\}$ triplet, where the actual encoding bitrate (R) is obtained from the training, the distortion (D) is measured by the mean-square-error (MSE) of luminance component of video frames and the complexity (C) is represented by encoding time per frame. Following is an algorithm for training the ECP mapping module 230 for control_bitrate bitrate control strategy with a multi-pass x.264 transcoding scheme:

1: Encode training videos using the control_bitrate strategy with all possible $\{ecp_0, ecp_1\}$ pairs and different target bitrates;
2: Obtain $\{R, D, C\}$ performance samples from the training;
3: Smoothly interpolate distortion D and computation time C over rate R for each $\{ecp_0, ecp_1\}$ pair for training videos;
4: Find a Pareto optimal set among $\{R, D, C\}$ samples and interpolate the Pareto set to obtain a piecewise continuous $\{R, D, C\}$ surface;
5: Divide the computation time C into 5 uniformly spaced continuation levels;
6: Select a rate value and choose the $\{ecp_0, ecp_1\}$ pair on the Pareto optimal surface for each of the five computation levels at the selected bitrate value;
7: Verify the effectiveness of the optimized strategy by a regression test on the videos.

The optimized computation allocations for five computation levels with control_bitrate control strategy is illustrated in TABLE 1 below:

TABLE 1

ECP Parameters for control_bitrate Control Strategy with x.264

| Computation Levels | $ecp_0$ | $ecp_1$ |
|---|---|---|
| Fastest | 0.14 | NULL |
| Fast | 0.35 | NULL |
| Medium | 0.07 | 0.50 |
| Slow | 0.07 | 0.71 |
| Slowest | 0.42 | 0.71 |

As illustrated in TABLE I, for each computation level, the ECP mapping module 230 provides a pair of ECP values {$ecp_0$, $ecp_1$} indicating the number of encoding passes and computational complexity allocation control parameter values needed. For example, for encoding a video having a medium computation complexity using control_bitrate control strategy, two encoding passes can be used to achieve optimized rate-distortion-complexity trade-off, and for the first encoding pass, the ECP value is 0.07 and 0.50 for the second encoding pass. To encode a video for real-time streaming, encoding time needs to be fast without unacceptable delay. The RDC based video coding system 102 can choose one-pass encoding with ECP value of 0.35 to balance the rate-distortion-complexity trade-off.

In another embodiment, the ECP mapping module 230 is trained using another video encoding scheme, VP8 (also referred to as WebM). Instead of using encoding computation profile parameters (i.e., $ecp_0$, $ecp_1$), VP8 uses encoding speed control (ES) parameters to manage the trade-off among rate, distortion and computation complexity. TABLE 2 shows an example of computation allocations for five computation levels with control_bitrate control strategy using VP8 encoding scheme:

TABLE 2

ES Parameters for Control_bitrate Control Strategy with VP8

| Computation Levels | $ES_0$ | $ES_1$ |
|---|---|---|
| Fastest | 219 | NULL |
| Fast | 218 | NULL |
| Medium | 220 | 217 |
| Slow | 220 | 218 |
| Slowest | 218 | 216 |

The ECP mapping module 230 is similarly trained on the videos from the video corpus 160 for other bitrate control strategies, such as control_quality strategy and control_quality_bounded_bitrate strategy. TABLE 3 shows the optimized computation allocations for five computation level with control_quality control strategy with x.264 encoding scheme and corresponding computation allocations for VP8 encoding scheme. To achieve a constant target quality, only one pass encoding is suggested by the ECP mapping module 230 to the RDC based video transcoding. TABLE 4 shows the optimized computation allocations for five encoding computation level with control_quality_bounded_bitrate control strategy with x.264 encoding scheme and corresponding computation allocations for VP8 encoding scheme.

TABLE 3

ECP Parameters and ES Parameters for Control_Quality Control Strategy

| Computation Levels | x.264 ecp | VP8 ES |
|---|---|---|
| Fastest | 0.14 | 219 |
| Fast | 0.35 | 218 |
| Medium | 0.50 | 217 |
| Slow | 0.71 | 216 |
| Slowest | 0.78 | 216 |

TABLE 4

ECP Parameters and ES Parameters for Control_Quality_Bounded_Bitrate Control Strategy

| Computation Levels | x.264 | | VP8 | |
|---|---|---|---|---|
| | $ecp_0$ | $ecp_1$ | $ES_0$ | $ES_1$ |
| Fastest | 0.14 | NULL | 220 | 219 |
| Fast | 0.35 | NULL | 220 | 218 |
| Medium | 0.14 | 0.50 | 220 | 218 |
| Slow | 0.14 | 0.71 | 220 | 217 |
| Slowest | 0.50 | 0.71 | 220 | 216 |

Figure 6:
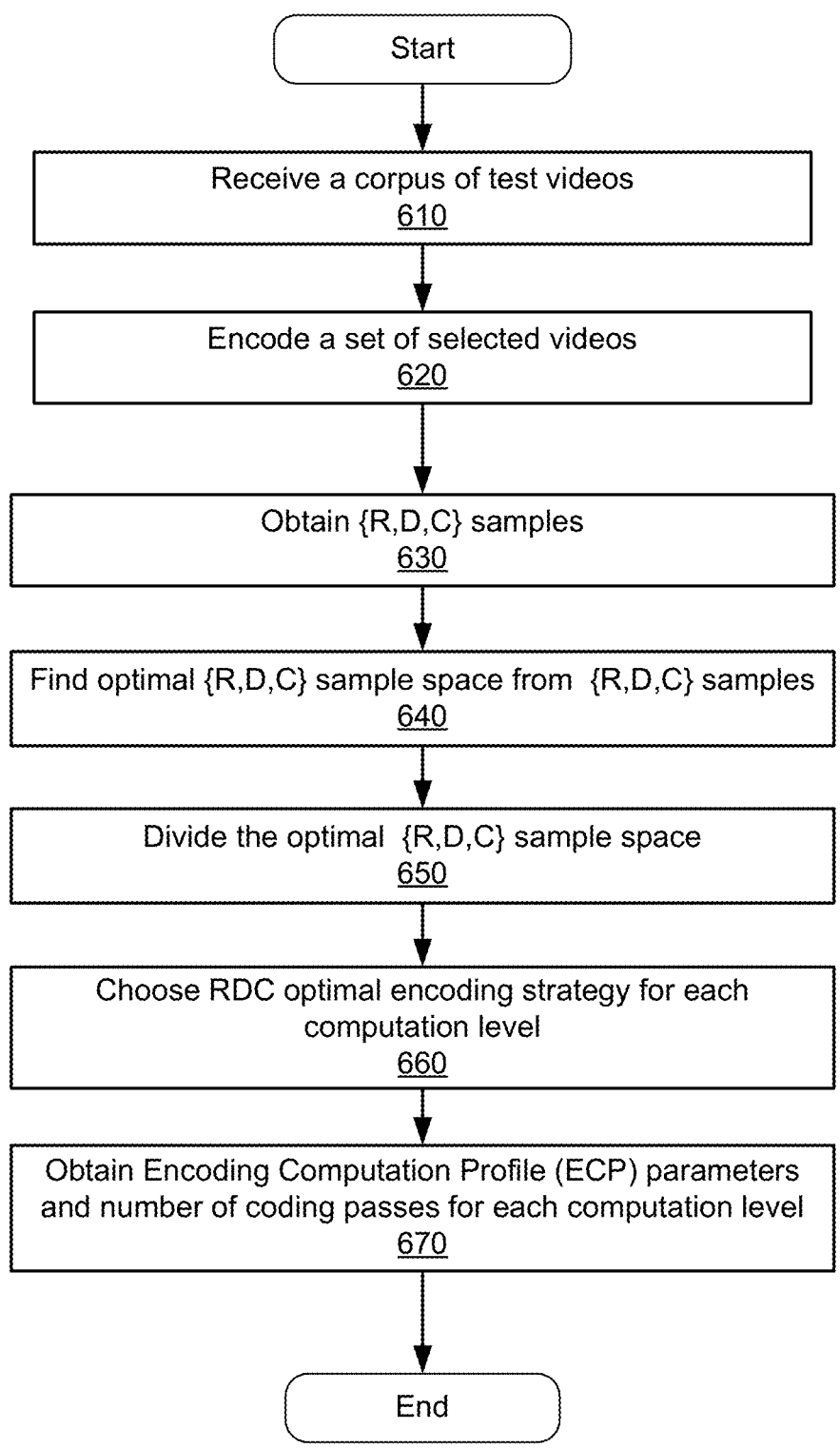
FIG. 6 is a flow chart of off-line training encoding computation profile (ECP) mapping module for RDC optimization.

FIG. 6 is a flow chart of training the ECP mapping module 230 off-line for rate-distortion-complexity optimization. Initially, the RDC training module 200 receives 610 videos from the video corpus 160. The video encoder 210 of the RDC training module 200 encodes 620 a set of selected videos and obtains 630 {R, D, C} samples from the training. The ECP mapping module 230 finds 640 optimal {R, D, C} samples from the obtained {R, D, C} samples. For example, the ECP mapping module 230 finds a Pareto optimal set among {R, D, C} samples and interpolates the Pareto set to obtain a piecewise continuous {R, D, C} surface. The ECP mapping module 230 divides 650 the optimal {R, D, C} sample space into multiple computation complexity levels (e.g., five computation levels described above). The ECP mapping module 230 chooses 660 a RDC optimal encoding strategy (e.g., control_quality_bounded_bitrate strategy) for each computation level and obtains 670 the ECP parameters and number of encoding passes for each computation level.

RDC based video coding system 102 can optimize multi-pass encoding performance by adjusting encoding parameters of subsequent encoding passes based on previous encoding pass. For example, in a two-pass encoding scheme to encode an input video, the RDC based video coding system 102 can adapt the encoding parameters (e.g., bitrate, motion estimation methods and motion vector search range) of the second encoding pass based on the encoding parameters of the first encoding pass. If the actual bitrate of the first encoding pass is less than an average bitrate encoded with the same ECP value, it indicates that the input video has simpler video content than an average video, the ECP value of the second encoding pass can be decreased to save computations for encoding the input video while keeping the same rate-distortion performance. If the actual bitrate of the first encoding pass is larger than an average bitrate encoded with the same ECP value, the ECP value of the second encoding pass can be increased to achieve more rate-distortion performance gain for encoding the input video.

V. Encoding with Video Description Length (VDL)

To transcode a source video with acceptable visual quality at minimal cost needs effectively evaluates the video encoding complexity of the source video. Ignoring the impact of video content complexity on transcoding a video degrades the visual quality of the transcoded video and user experience. The information about how many bitrates are needed to encode videos at certain visual quality is useful for video encoding efficiency optimization because the bitrate information for encoding an input video reflects the video content complexity of the source video.

In one embodiment, the RDC based video coding system 102 uses video description length to represent the video content complexity of a video. VDL is the bitrate needed to encode the video at a certain visual quality. Different videos have different VDLs. Videos with slow motion and smooth images have short VDLs, indicating that the videos are easy to encode with small bitrate but high visual quality. On the other hand, videos with intensive motion and complex textural content have long VDLs, indicating that the videos are difficult to encode.

Video description length is very useful for many applications like adaptive video encoding and decoding. For video transcoding, VDL guides a RDC based video transcoder to choose a target bitrate or a target constant rate factor to encode the video into its output video formats efficiently. The RDC based video transcoder can compare the complexity of an input video with a reference video in terms of their associated VDLs, and determines the proper encoding parameters for the input video by referring to the existing reasonable encoding parameters of the reference video.

VDL information of a video can have at least three forms:
Overall VDL,
Temporal VDL, and
Spatial VDL.

The overall VDL is the actual bitrate of a video when it is encoded with 'CRF=26, complexity=fastest.' The CRF value is a configurable parameter and experimental data shows that a video is in good visual quality when the video is encoded with CRF=26 with CRF encoding.

The temporal VDL is the difference of the actual bitrate of a video when it is encoded with two different complexities, e.g., 'CRF=26, complexity=fast' and 'CRF=26, complexity=fastest'. The temporal VDL of a video reflects the temporal complexity of the video. Videos having different temporal complexity differ mostly from how fast to process motion detected in the videos. How fast a detected motion in a video to be processed depends on one or more factors, such as motion estimation method and number of reference frames used for the motion estimation. One embodiment of representing the temporal VDL is using the bitrate difference of a video when encoding the video at different complexity levels.

The spatial VDL is the difference of the actual bitrate of a video when it is encoded with two different CRFs, e.g., 'CRF=26, complexity=fastest' and 'CRF=28, complexity=fastest'. Generally, complexity of residual signal predicted by a motion estimation algorithm reflects the complexity of video frames, and the transform coefficients of residual signal undergo quantization represented by CRF values. Therefore, the difference of bitrates of a video encoded with different CRF values but same complexity level reduces the temporal factor influence, and reflects the spatial complexity of the video. A video with a larger spatial VDL has more complex spatial content in the video.

The overall VDL, temporal VDL and spatial VDL of a video can be used to guide RDC based video transcoding. For example, with reference to FIG. 4, the video description length module 420 of the RDC based video transcoding module 400 obtains overall VDL, temporal VDL and spatial VDL of an input video from encoding the input video. The obtained VDL data of the input video is stored in a dynamic VDL database as reference VDL for the input video. For example, the video description length module 420 maintains a dynamic reference table for overall VDL, where each table entry stores the identification of the input video, the overall VDL of the input video, the temporal resolution and spatial resolution of the input video. After transcoding the video, the video description length module 420 deletes the VDL reference of the input video. The video description length module 420 similarly maintains a dynamic reference table for temporal VDL and spatial VDL, respectively. The overall VDL obtained for one video output format of the input video can be used to guide the encoding of the input video for other video output formats. The temporal and spatial VDL obtained for one video output format of the input video can be similarly used for other video output formats of the input video.

In another embodiment, the RDC based video coding system 102 generates a static VDL reference table for overall VDL, temporal VDL and spatial VDL of videos of the video corpus 160 based on the VDL data stored in the dynamic VDL reference tables. For example, the static VDL reference table for overall VDL stores the averaged overall VDL data for each individual input data for a selected temporal resolution and another static VDL reference table for overall VDL for a selected spatial resolution. Static VDL reference tables for temporal VDL and spatial VDL for a selected temporal resolution or a spatial resolution can be similarly generated. The static VDL reference tables can be updated each time a record in the dynamic VDL reference table is generated or updated.

For a given input video, the video description length module 420 computes the overall VDL, temporal VDL and spatial VDL of the input video as described above and communicates with the RDC-based transcoder 430 for rate-distortion-complexity optimization. For example, in response to the overall VDL of an input video less than the target bitrate of the input video, the video description length module 420 sets the overall VDL of the input video as the target bitrate. Setting the overall VDL as the target bitrate of the input video helps obtain a good visual quality. In response to the spatial VDL of the input video larger than the spatial VDL of a reference video, the video description length module 420 instructs the RDC-based transcoder 430 to increase complexity level of encoding regarding spatial processing (e.g., changes the complexity level from, e.g., "medium" to "fast.") Similarly, the video description length module 420 instructs the RDC-based transcoder 430 to adjust complexity level of encoding regarding temporal processing of the input video based on the comparison between the temporal VDL of the input video with that of a reference video.

Figure 3:
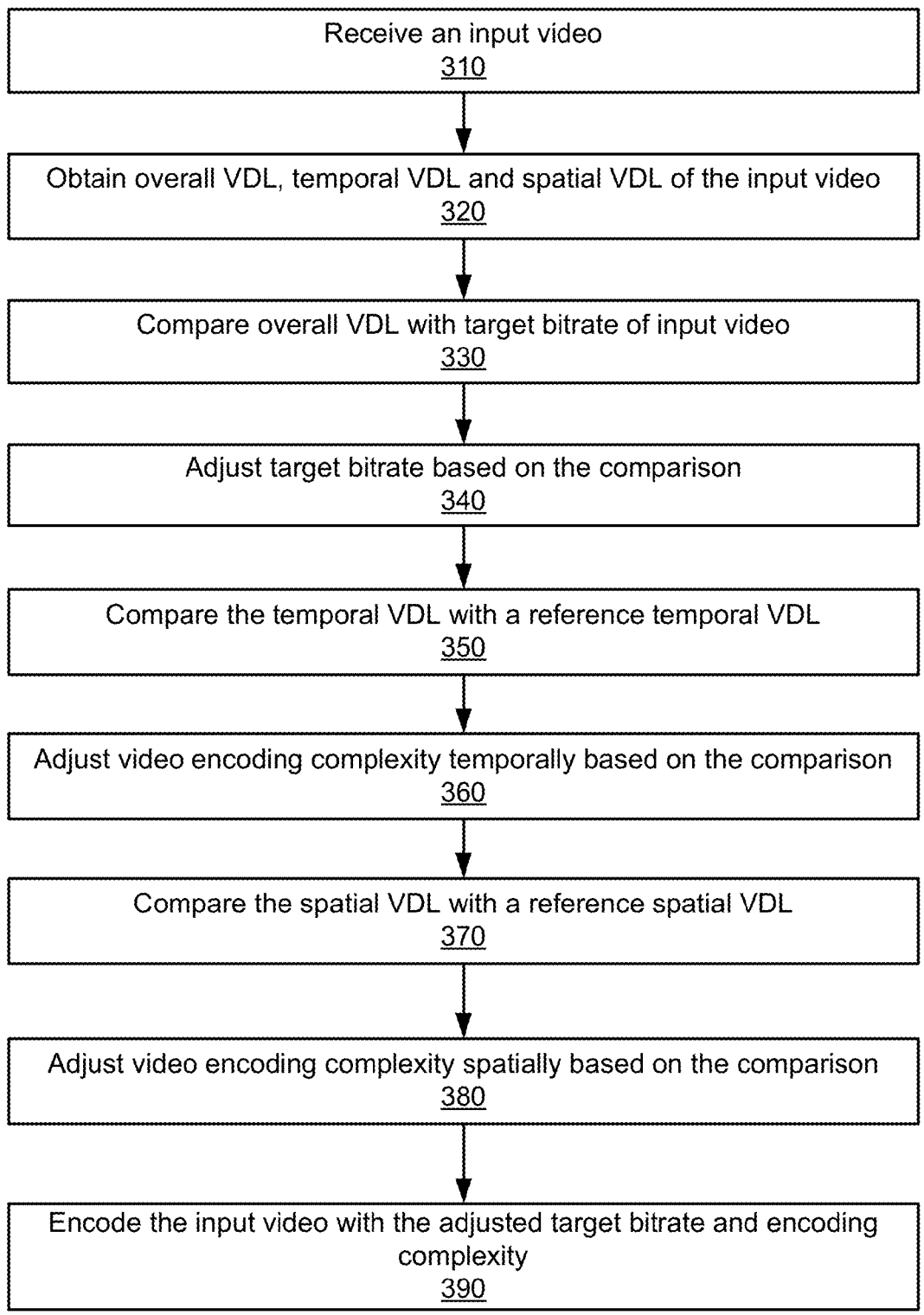
FIG. 3 is a flow chart of video description length guided constant quality video encoding of an input video under bitrate constraint with RDC optimization.

FIG. 3 further illustrates the VDL guided video transcoding described above. Initially, the RDC based video transcoding module 400 receives 310 an input video and encodes the input video via the revised CRF-bitrate model 410. The video description length module 420 obtains 320 the overall VDL, temporal VDL and spatial VDL of the input video. The video description length module 420 obtains the VDL information of the input video from the encoding by the revised CRF-bitrate model 410 or computes the VDL information of the input video by itself.

The video description length module 420 compares 330 the overall VDL of the input video with the target bitrate of the input video and adjusts 340 the target bitrate of the input video based on the comparison (e.g., setting the overall VDL of the input video as the target bitrate of the input video responsive to the overall VDL smaller than the target bitrate). The video description length module 420 compares 350 the temporal VDL of the input video with a reference temporal VDL and adjusts 360 the video encoding complexity temporally based on the comparison. The video description length module 420 compares 370 the spatial VDL of the input video with a reference spatial VDL and adjusts 380 the video encoding complexity spatially based on the comparison. The RDC-based transcoder 430 encodes 390 the input video with the adjusted target bitrate, temporal encoding complexity and spatial encoding complexity as illustrated in FIG. 4. The adjusted target bitrate, temporal or spatial encoding complexity indicate that different ECP values and number of encoding passes are needed to reflect the target bitrate and encoding complexity updates.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the invention include process steps and instructions described herein in the form of an algorithm. It should be noted that the process steps and instructions of the invention could be embodied in software, firmware or hardware, and when embodied in software, could be downloaded to reside on and be operated from different platforms used by real time network operating systems.

The invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will be apparent to those of skill in the, along with equivalent variations. In addition, the invention is not described with primary to any particular programming language. It is appreciated that a variety of programming languages may be used to implement the teachings of the invention as described herein, and any reference to specific languages are provided for disclosure of enablement and best mode of the invention.

The invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the invention is intended to be illustrative, but not limiting, of the scope of the invention, which is set forth in the following claims.

What is claimed is:

1. A computer system for optimizing encoding bitrate, distortion and complexity of an input video, the system comprising:
 a video description length (VDL) module configured to:
  obtain an overall VDL, a temporal VDL and a spatial VDL of the input video, the overall VDL of the input video indicating overall content complexity of the input video, the temporal VDL of the input video indicating temporal complexity of the input video and the special VDL of the input video indicating spatial complexity of the input video; and
  compare the overall VDL, the temporal VDL and the spatial VDL of the input video with corresponding reference overall VDL, reference temporal VDL and reference spatial VDL;
  adjust an encoding bitrate, the overall encoding complexity, the temporal encoding complexity and the spatial encoding complexity of the input video based on the comparison; and
 a video transcoder, coupled with the video description length module, configured to:
  encode the input video with the adjusted encoding bitrate, the overall encoding complexity, the temporal encoding complexity and the spatial encoding complexity of the input video.

2. The system of claim 1, wherein the overall VDL of the input video is represented by actual bitrate of the input video encoded with a predetermined constant rate factor and a computation complexity level.

3. The system of claim 1, wherein the temporal VDL of the input video is represented by the difference between the actual bitrates of the input video encoded with a same predetermined constant rate factor and different computation complexity levels.

4. The system of claim 1, wherein the spatial VDL of the input video is represented by the difference between the actual bitrates of the input video encoded with different predetermined constant rate factors and a same computation complexity level.

5. The system of claim 1, wherein the reference overall VDL, temporal VDL and spatial VDL are from at least one row of a dynamic complexity reference table or a static complexity reference table.

6. The system of claim 5, wherein the dynamic VDL reference table maintains the reference overall VDL, temporal VDL and spatial VDL generated from encoding the input video.

7. The system of claim 5, wherein the static VDL reference table maintains the average overall VDL, temporal VDL and spatial VDL of videos stored in a video corpus.

8. The system of claim 1, wherein the video transcoder is further configured to:
   encode the input video with a constant rate factor (CRF) obtained from a CRF reference bitrate model based on a target bitrate associated with the input video;
   compute a revising factor from the encoding;
   modify the CRF reference bitrate model with the revising factor; and
   encode the input video with the constant rate factor obtained from the modified CRF reference bitrate model.

9. The system of claim 8, wherein the video transcoder is further configured to:
   verify whether the actual bitrate of encoding the input video with the modified constant bitrate factor is within a predetermined range of the target bitrate of the input video.

10. The system of claim 8, wherein the CRF reference bitrate model is configured to:
    model relationship between the constant rate factor and rate-distortion performance of video encoding on a plurality of videos; and
    obtain one or more relationships between a constant rate factor and average bitrate of video encoding from the modeling.

11. The system of claim 10, wherein the relationship between the constant rate factor and the rate-distortion performance of video encoding models the relationship between a constant rate factor and an average bitrate of encoding a plurality of videos.

12. A method for optimizing encoding bitrate, distortion and complexity of an input video, the method comprising:
    obtaining an overall video description length (VDL), a temporal VDL and a spatial VDL of the input video, the overall VDL of the input video indicating overall content complexity of the input video, the temporal VDL of the input video indicating temporal complexity of the input video and the special VDL of the input video indicating spatial complexity of the input video; and
    comparing the overall VDL, the temporal VDL and the spatial VDL of the input video with corresponding reference overall VDL, reference temporal VDL and reference spatial VDL;
    adjusting an encoding bitrate, the overall encoding complexity, the temporal encoding complexity and the spatial encoding complexity of the input video based on the comparison; and
    encoding the input video with the adjusted encoding bitrate, the overall encoding complexity, the temporal encoding complexity and the spatial encoding complexity of the input video.

13. The method of claim 12, wherein the overall VDL of the input video is represented by actual bitrate of the input video encoded with a predetermined constant rate factor and a computation complexity level.

14. The method of claim 12, wherein the temporal VDL of the input video is represented by the difference between the actual bitrates of the input video encoded with a same predetermined constant rate factor and different computation complexity levels.

15. The method of claim 12, wherein the spatial VDL of the input video is represented by the difference between the actual bitrates of the input video encoded with different predetermined constant rate factors and a same computation complexity level.

16. The method of claim 12, wherein the reference overall VDL, temporal VDL and spatial VDL are from at least one row of a dynamic complexity reference table or a static complexity reference table.

17. The method of claim 12, wherein encoding the input video with the adjusted overall encoding complexity, the temporal encoding complexity and the spatial encoding complexity of the input video further comprises:
    encoding the input video with a constant rate factor (CRF) obtained form a CRF reference bitrate model based on a target bitrate associated with the input video;
    computing a revising factor from the encoding;
    modifying the CRF reference bitrate model with the revising factor; and
    encoding the input video with the constant rate factor obtained from the modified CRF reference bitrate model.

18. The method of claim 17, further comprising:
    verifying whether the actual bitrate of encoding the input video with the modified constant bitrate factor is within a predetermined range of the target bitrate of the input video.

19. The method of claim 17, further comprising:
    modeling relationship between the constant rate factor and rate-distortion performance of video encoding on a plurality of videos; and
    obtaining one or more relationships between a constant rate factor and average bitrate of video encoding from the modeling.

20. The method of claim 19, wherein the relationship between the constant rate factor and the rate-distortion performance of video encoding models the relationship between a constant rate factor and an average bitrate of encoding a plurality of videos.

21. A non-transitory computer-readable storage medium having executable computer program instructions recorded thereon for optimizing encoding bitrate, distortion and complexity of an input video, the computer program instructions comprise instructions for:
    obtaining an overall video description length (VDL), a temporal VDL and a spatial VDL of the input video, the overall VDL of the input video indicating overall content complexity of the input video, the temporal VDL of the input video indicating temporal complexity of the input video and the special VDL of the input video indicating spatial complexity of the input video; and
    comparing the overall VDL, the temporal VDL and the spatial VDL of the input video with corresponding reference overall VDL, reference temporal VDL and reference spatial VDL;

adjusting an encoding bitrate, the overall encoding complexity, the temporal encoding complexity and the spatial encoding complexity of the input video based on the comparison; and encoding the input video with the adjusted encoding bitrate, the overall encoding complexity, the temporal encoding complexity and the spatial encoding complexity of the input video.

22. The computer-readable storage medium of claim 21, wherein the overall VDL of the input video is represented by actual bitrate of the input video encoded with a predetermined constant rate factor and a computation complexity level.

23. The computer-readable storage medium of claim 21, wherein the temporal VDL of the input video is represented by the difference between the actual bitrates of the input video encoded with a same predetermined constant rate factor and different computation complexity levels.

24. The computer-readable storage medium of claim 21, wherein the spatial VDL of the input video is represented by the difference between the actual bitrates of the input video encoded with different predetermined constant rate factors and a same computation complexity level.

25. The computer-readable storage medium of claim 21, wherein the computer instructions for encoding the input video with the adjusted overall encoding complexity, the temporal encoding complexity and the spatial encoding complexity of the input video further comprise instructions for:

encoding the input video with a constant rate factor (CRF) obtained from a CRF reference bitrate model based on a target bitrate associated with the input video;

computing a revising factor from the encoding;

modifying the CRF reference bitrate model with the revising factor; and encoding the input video with the constant rate factor obtained from the modified CRF reference bitrate model.

26. The computer-readable storage medium of claim 25, further comprising computer instructions for:

modeling relationship between the constant rate factor and rate-distortion performance of video encoding on a plurality of videos; and obtaining one or more relationships between a constant rate factor and average bitrate of video encoding from the modeling.

27. The computer-readable storage medium of claim 26, wherein the relationship between the constant rate factor and the rate-distortion performance of video encoding models the relationship between a constant rate factor and an average bitrate of encoding a plurality of videos.

* * * * *

UNITED STATES PATENT AND TRADEMARK OFFICE
CERTIFICATE OF CORRECTION

PATENT NO. : 8,885,702 B2  
APPLICATION NO. : 13/275090  
DATED : November 11, 2014  
INVENTOR(S) : Lei Yang and Debargha Mukherjee It is certified that error appears in the above-identified patent and that said Letters Patent is hereby corrected as shown below:

In the Claims

Column 20, Claim 17, line 24, delete "obtained form" and insert --obtained from--.

Column 20, Claim 21, line 59, delete "video and the special" and insert --video and the spatial--.

Signed and Sealed this  
Fifth Day of January, 2016

Michelle K. Lee  
*Director of the United States Patent and Trademark Office*